US006987956B2

(12) United States Patent
Yoon

(10) Patent No.: US 6,987,956 B2
(45) Date of Patent: Jan. 17, 2006

(54) SYSTEM AND METHOD FOR IMPROVING PERFORMANCE OF AN HDR WIRELESS TERMINAL WITH DIVERSITY

(75) Inventor: Heung-Sik Yoon, Kumi-shi (KR)

(73) Assignee: Samsung Electronics Co., Ltd., (KR)

( * ) Notice: Subject to any disclaimer, the term of this patent is extended or adjusted under 35 U.S.C. 154(b) by 725 days.

(21) Appl. No.: 09/998,713

(22) Filed: Nov. 30, 2001

(65) Prior Publication Data

US 2003/0104796 A1 Jun. 5, 2003

(51) Int. Cl.
H04B 1/06 (2006.01)
(52) U.S. Cl. .................. 455/133; 455/272; 455/277.1; 455/277.2; 375/347; 370/276; 370/277; 370/282
(58) Field of Classification Search ................ 455/101, 455/103, 132, 133, 134, 135, 272, 277.1, 455/277.2, 73–86; 375/347; 370/276, 277, 370/282
See application file for complete search history.

(56) References Cited

U.S. PATENT DOCUMENTS

| | | | | |
|---|---|---|---|---|
| 5,809,405 A | * | 9/1998 | Yamaura | 455/101 |
| 5,960,039 A | * | 9/1999 | Martin et al. | 375/267 |
| 6,191,724 B1 | * | 2/2001 | McEwan | 342/21 |
| 6,330,433 B1 | * | 12/2001 | Jager | 455/277.2 |
| 6,535,748 B1 | * | 3/2003 | Vuorio et al. | 455/552.1 |
| 6,665,284 B1 | * | 12/2003 | Tran et al. | 370/334 |
| 6,697,605 B1 | * | 2/2004 | Atokawa et al. | 455/82 |
| 2002/0123319 A1 | * | 9/2002 | Peterzell | 455/296 |

\* cited by examiner

Primary Examiner—Curtis Kuntz
Assistant Examiner—Tuan Pham
(74) Attorney, Agent, or Firm—Dilworth & Barrese LLP

(57) ABSTRACT

Disclosed are a system and a method for improving performance in an HDR (High Data Rate) wireless terminal utilizing diversity techniques. The wireless terminal comprises two transmission paths, one including a duplexer and the other bypassing the duplexer, and two reception paths, one including the duplexer and the other not including a duplexer and completely isolated from any transmission path. When the terminal is determined to be in an HDR mode, the transmission path including the duplexer and both reception paths are utilized. When the terminal is operating in a low data rate mode, the transmission path bypassing the duplexer and the reception path completely isolated from the transmission paths are utilized, resulting in lower minimum detectable signal, thus reducing current consumption in the wireless terminal.

15 Claims, 4 Drawing Sheets

SYSTEM AND METHOD FOR IMPROVING PERFORMANCE OF AN HDR WIRELESS TERMINAL WITH DIVERSITY

BACKGROUND OF THE INVENTION

1. Field of the Invention

The present invention relates generally to an antenna diversity technique in a wireless terminal, and in particular, to a technique for improving transmission and reception of an HDR wireless terminal.

2. Description of the Prior Art

In a conventional wireless terminal, a transmitter shares a single antenna with a receiver. When a receiving antenna diversity technique is applied to the wireless terminal, a plurality of antennas is provided to selectively combine high-quality signals, thereby improving reception efficiency and increasing a data processing rate. FIG. 1 is schematic diagram illustrating a system for performing antenna diversity in the conventional wireless terminal. Referring to FIG. 1, the receiver Rx connected to switch SW1 detects the strength of a signal received through a specific antenna, either ANT1 or ANT2. If the signal detected through the specific antenna is above a predetermined threshold, the receiver Rx utilizes that specific antenna. If the detected signal is below the predetermined threshold, the receiver utilizes the other antenna by switching SW1 to the other antenna. After the receiver selects the antenna, the transmitter Tx utilizes the remaining antenna.

In addition, a conventional wireless terminal isolates transmission signals from reception signals through a duplexer, and performs voice and data services through a transmitter circuit and a receiver circuit. A schematic diagram of a conventional wireless terminal isolating transmission signals from reception signals through a duplexer is illustrated in FIG. 2. Referring to FIG. 2, a duplexer 200, interposed between the antenna and the transmitter Tx, isolates transmission signals from reception signals in order to perform full duplexing. That is, during transmission, the output power of the PAM (Power Amplifier Module) in the transmitter Tx (not shown) is transmitted to the antenna ANT through the duplexer 200 at maximum power. During reception, the low power RF signal is received through the antenna ANT and passed to a low noise amplifier (not shown) in the receiver Rx through the duplexer 200, to be received at maximum power. However, when transmitting transmission and reception signals at the maximum power there is a high insertion loss. Further, there is interference between the transmission and reception signals due to the incomplete isolation of the signals through the duplexer. This interference occurs because the transmission power is usually much higher than the reception power and interferes with the receiver.

A drawback with conventional wireless terminals is that when a transceiver uses a single antenna and a duplexer as a common path, a loss of the duplexer device itself and incomplete isolation between the transmitter and the receiver increase a level of the minimum detectable signal (MDS), resulting in an increase in current consumption by the wireless terminal.

Therefore, a need exists for a wireless terminal that completely isolates the transmission path from the reception path during a low data rate processing mode, and avoids using the duplexer, thus making it possible to decrease the level of the minimum detectable signal and the current consumption of the wireless telephone.

SUMMARY OF THE INVENTION

It is, therefore, an object of the present invention is to increase the transmission and reception performance of a wireless terminal in an HDR (High Data Rate) transmission system during low rate data processing.

It is another object of the present invention to provide a wireless terminal that completely isolates the transmission path from the reception path during a low data rate processing mode, and avoids using the duplexer, thus making it possible to decrease the level of the minimum detectable signal and the current consumption of the wireless telephone.

It is yet another object of the present invention to provide a wireless terminal that utilizes a first reception path, a second reception path and a transmission path during a high data rate processing mode.

To achieve the above and other objects, there is provided a wireless terminal comprising a first receiver for general signal transmission and reception, such as voice transmission, including a first antenna, a first reception path through a duplexer, a first transmission path through the duplexer, a second transmission path bypassing the duplexer, and a transmission switch for switching between the first and second transmission paths. The wireless terminal also comprises a second receiver for receiving high-rate data including a second antenna and a second reception path. Since the second receiver does not perform transmission, it is not connected to the duplexer.

Also provided is a method for achieving the above and other objects, utilizing the above system. If it is determined that an HDR transmission is occurring, the transmission switch is positioned to utilize the first transmission path in the first receiver. Incoming signals are then received by commonly utilizing the first and second reception paths. If HDR transmission is not detected, the transmission switch is positioned to utilize the second transmission path bypassing the duplexer in the first receiver. The incoming signals are then received by utilizing only the second reception path in the second receiver. By completely isolating the transmission path from the reception path during a low data rate processing mode, and avoiding using the duplexer, the level of the minimum detectable signal is decreased and the current consumption of the wireless phone is also lowered.

BRIEF DESCRIPTION OF THE DRAWINGS

The above and other objects, features and advantages of the present invention will become more apparent from the following detailed description when taken in conjunction with the following drawings in which.

DETAILED DESCRIPTION OF THE PREFERRED EMBODIMENT

A preferred embodiment of the present invention will be described herein below with reference to the accompanying drawings. In the following description, well known functions or constructions are not described in detail since they would obscure the invention in unnecessary detail.

Figure 1:
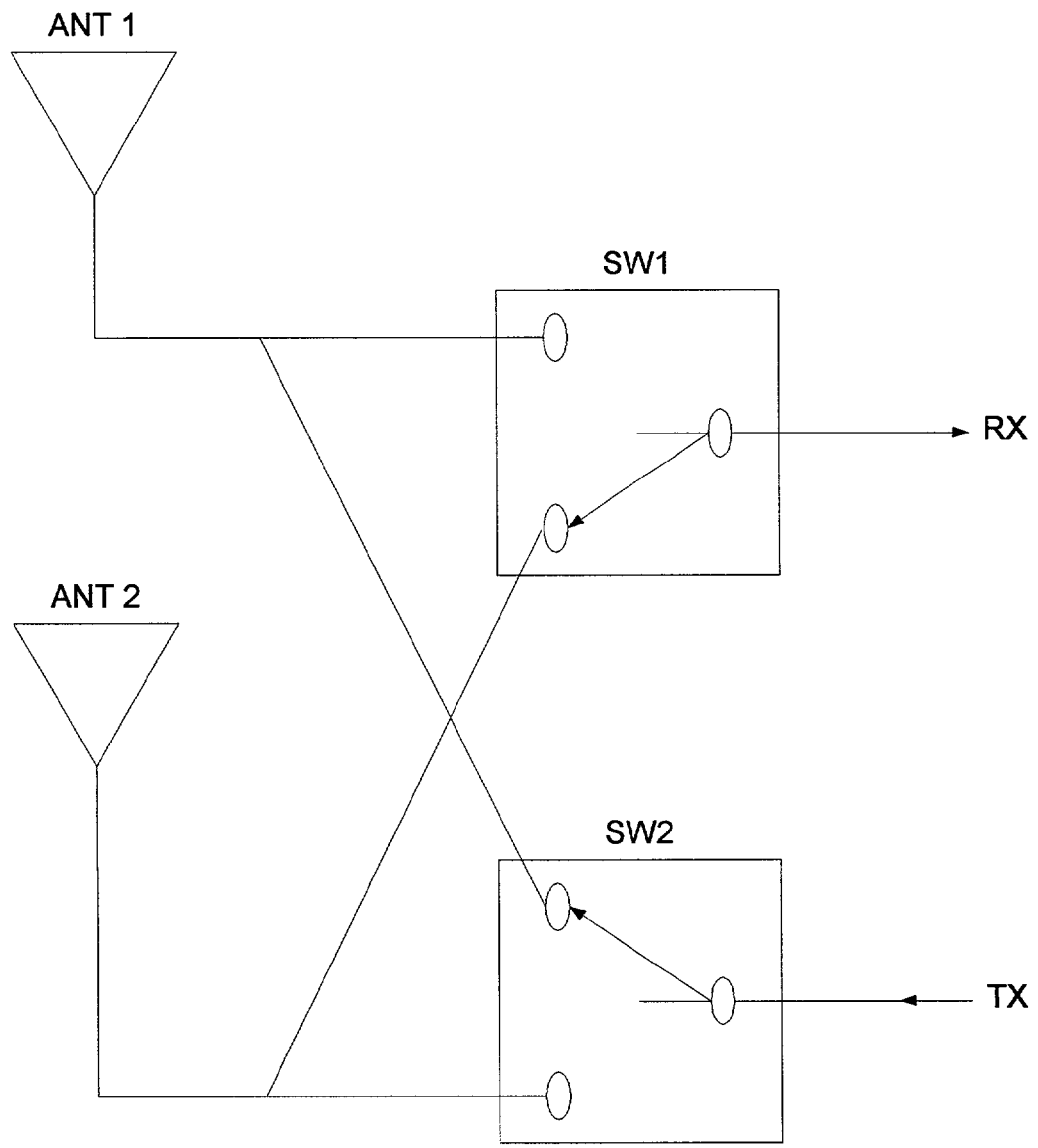
FIG. 1 is schematic diagram illustrating a system for performing antenna diversity in a conventional wireless terminal.
Figure 2:
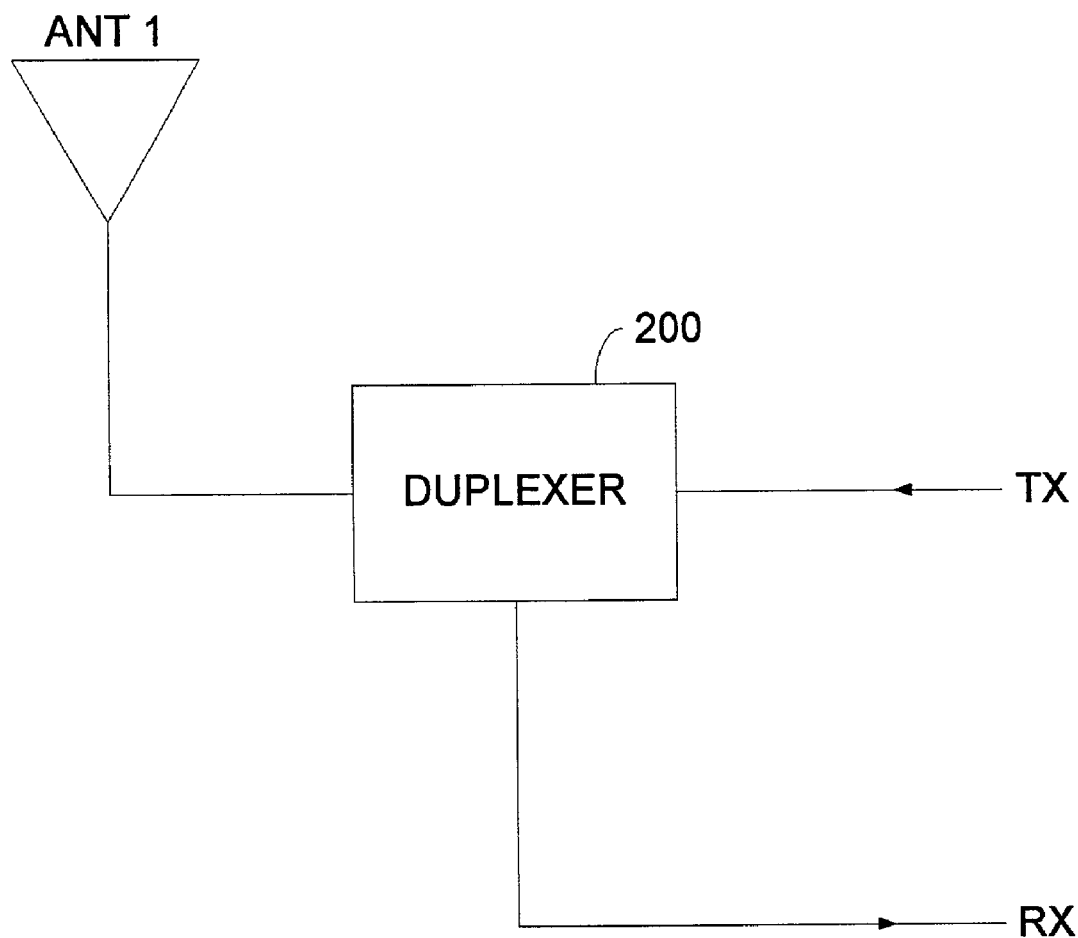
FIG. 2 is schematic diagram illustrating a conventional wireless terminal isolating transmission signals from reception signals through a duplexer.
Figure 3:
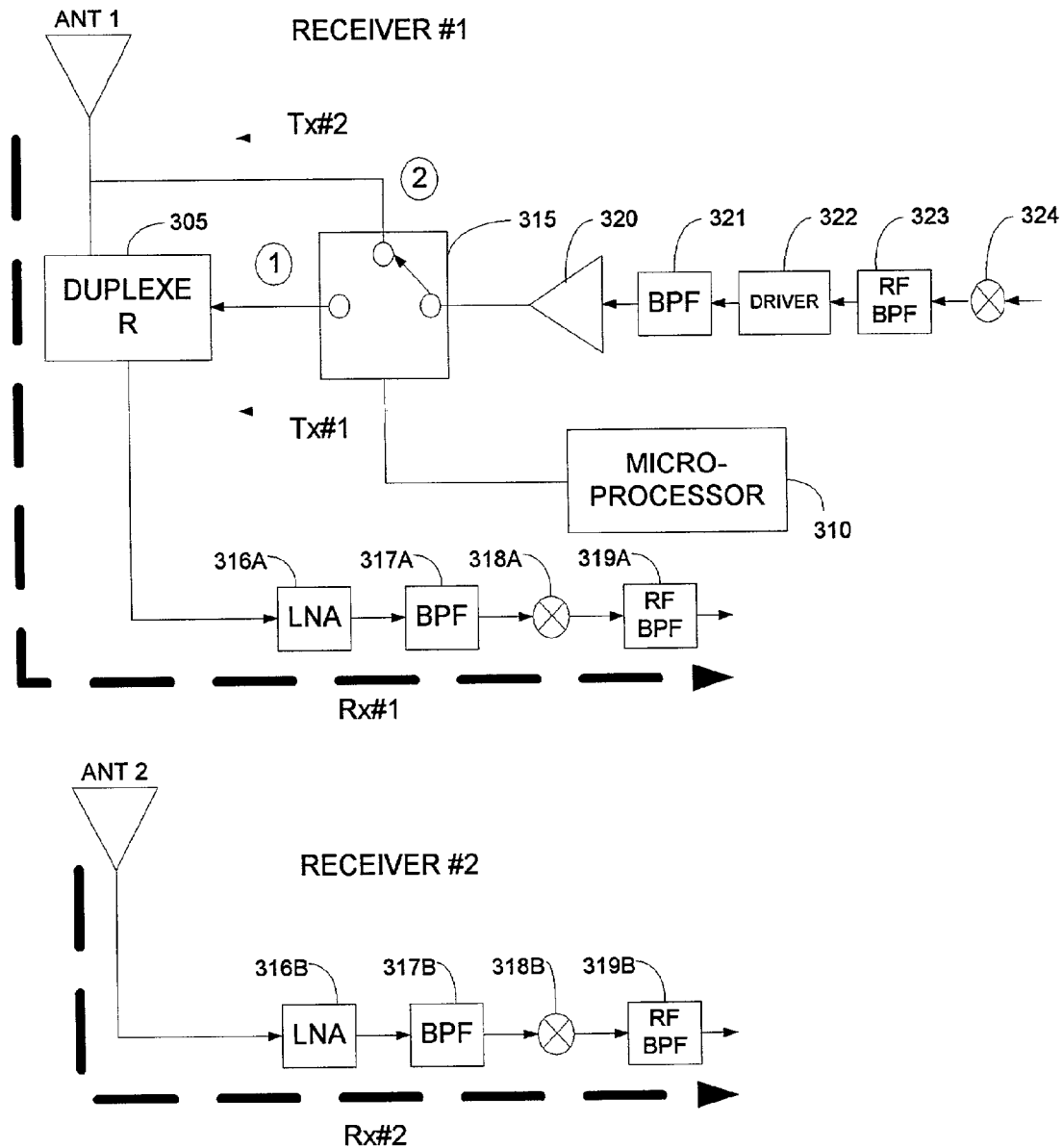
FIG. 3 is a schematic diagram of an HDR wireless terminal according to a preferred embodiment of the present invention.

Referring now to the drawings, in which like reference numerals identify similar or identical elements throughout the several views, FIG. 3 is a schematic diagram of an HDR wireless terminal according to a preferred embodiment of the present invention. Referring to FIG. 3, a wireless terminal with a plurality of antennas (in this example, two antennas), to which the present invention is directed, a first receiver (Receiver #1) and a second receiver (receiver #2) are connected to a first antenna ANT1 and a second antenna ANT2, respectively. Receiver #1 performs both transmission and reception of signals in the wireless terminal, while Receiver #2, for receiving high rate (or high speed) data of a maximum of 2.4 Mbps, defined by the IS-856 standard, performs only signal reception. The receiver #2 exclusively performs an operation of the known 1x EV-DO (evolution-data only). In order to perform both signal transmission and reception, Receiver #1 comprises a first transmission path Tx#1, a second transmission path Tx#2, and a reception path Rx#1. Since Receiver #2 only performs signal reception, it comprises only a reception path Rx#2.

First, the structure of Receiver #1 of the preferred embodiment will be described. As stated above, Receiver #1 comprises a first transmission path Tx#1, a second transmission path Tx#2, and a reception path Rx#1. Except for the provision of duplexer 305, the structures of the transmission paths Tx#1 and Tx#2 are substantially identical. Both Tx#1 and Tx#2 comprise a multiplier 324, an RF BPF (Radio Frequency Band Pass Filter) 323, a driver 322, a BPF (Band Pass Filter) 321, and a power amplifier 320 connected in series to a transmission switch 315. The transmission switch 315, controlled by a microprocessor 310, determines whether Tx#1 or Tx#2 is utilized depending on the position of the transmission switch 315. To control the transmission switch 315 position, the microprocessor determines whether the wireless terminal is in a low data processing mode or in a high data rate processing mode. If the wireless terminal is in a low data rate processing mode, the transmission switch 315 is switched to position 1. If the microprocessor determines that the wireless terminal is in a high data rate processing mode, the transmission switch 315 is switched to position 2. When the transmission switch 315 is in position 1, Tx#1 is utilized and the transmission signal runs through the duplexer 305 to the antenna ANT1. Alternatively, when the transmission switch 315 is in position 2, Tx#2 is utilized and the transmission signal bypasses the duplexer 305 and flows directly to the antenna ANT1. The reception path Rx#1 of Receiver 1 comprises the antenna ANT1, the duplexer 305, an LNA (Low Noise Amplifier) 316A, BPF 317A, a multiplier 318A, and an RF BPF 319A connected in series.

Receiver #2 comprises a reception path Rx#2, the structure of which is substantially identical to Rx#1 except duplexer 305 is not provided. Rx#2 comprises an antenna ANT2, an LNA 316B, BPF 317B, a multiplier 318B, and an RF BPF 319B connected in series for receiving data in when the wireless terminal is in either a low data rate processing mode or a high data rate processing mode.

In general, antennas used in wireless terminals include a helical antenna protruding outside the wireless terminal and a whip antenna. In the preferred embodiment of the present invention, these types of antennas are also used, although not limited to. The helical antenna operates when the whip antenna is retracted into the interior of the wireless terminal and the whip antenna operates when extended from the wireless terminal.

Table 1, pictured herein below, illustrates the characteristics of the antennas ANT1 and ANT2.

TABLE 1

| | Band | Type |
|---|---|---|
| ANT1 | Rx/Tx, Wideband | Helical Antenna Combined with a Whip Antenna |
| ANT2 | Rx, Narrowband | Helical Antenna (According to the antenna length, it is possible to use a whip antenna.) |

Figure 4:
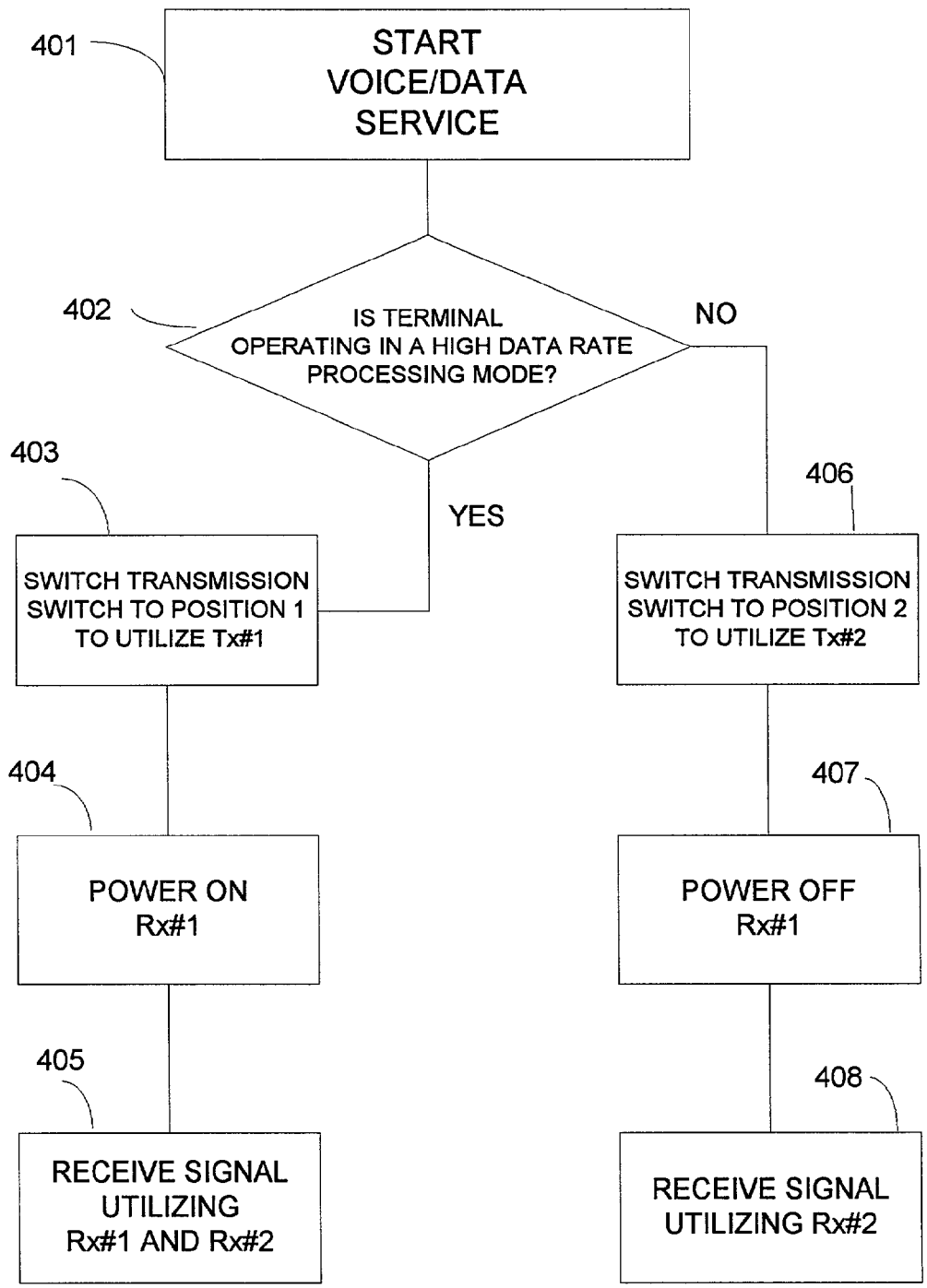
FIG. 4 is a flow chart illustrating a method of operation for the preferred embodiment of FIG. 3.

A method of operation for the preferred embodiment will now be described with reference to FIGS. 3 and 4. Referring to FIG. 4, a flow chart illustrating a method of operation for the preferred embodiment of FIG. 3, a voice data service is initiated in step 401. In step 402, the microprocessor 310 determines whether to operate the wireless terminal in a high data rate processing mode or a low data rate processing mode. If the microprocessor 310 determines in step 402 that the wireless terminal should be operating in a high data rate processing mode, then in step 403, the microprocessor 310 switches transmission switch 315 to position 1. With the transmission switch 315 in position 1, the transmission path Tx#1, including the duplexer 305, will be utilized for transmitting at a high data rate. The duplexer 305 is used to isolate the transmission signals along Tx#1 from the reception signals along Rx#1. In step 404, reception path Rx#1 is powered on and is utilized along with reception path Rx#2 of receiver #2 to receive signals in step 405. Rx#1 and Rx#2 are used alternatively, depending on which of the two reception paths are receiving a stronger signal.

If the microprocessor 310 determines in step 402, that the wireless terminal should not operate in a high data rate processing mode, rather in a low data rate processing mode, then in step 406, the transmission switch 315 is switched by the microprocessor 310 to position 2. With the transmission switch in position 2, the transmission path Tx#2, which bypasses the duplexer 305, is utilized. In step 407, the reception path Rx#1 is powered off and the task of receiving the signals is performed solely by reception path Rx#2, which is completely isolated from transmission path Tx#2, in receiver #2 in step 408. This results in a lower minimum detectable signal, which enables the wireless terminal to receive a signal of lower power, thus reducing power consumption.

Table 2 is provided herein below to further illustrate the operation of the wireless terminal.

TABLE 2

| | | Operation | |
|---|---|---|---|
| Mode | Transceiver in Use | Transmission Switch Position | Duplexer |
| Low Data Rate Process Mode | Rx#2, Tx#2 | 2 | Unused |
| High Data Rate Process Mode | Rx#1 and Rx#2, Tx#1 | 1 | In Use |

As described herein above, the existing wireless terminal processing in a low data rate mode has limited performance due to the use of a duplexer. The present invention, however, completely isolates the transmission path from the reception path during a low data rate processing mode, and avoids using the duplexer, thus making it possible to decrease the level of the minimum detectable signal and the current consumption of the wireless phone.

While a preferred embodiment of the present invention has been described herein above, it will be understood by those skilled in the art that various changes in form and detail may be made therein without departing from the spirit and scope of the invention as defined by the appended claims.

What is claimed is:

1. A system for improving performance in an HDR (High Data Rate) wireless terminal using diversity techniques, comprising:

a first receiver for signal transmission and reception including a first antenna, a first reception path through a duplexer, a first transmission path through said duplexer, a second transmission path bypassing said duplexer, and a transmission switch for switching between said first and second transmission paths; and a second receiver for receiving high-rate data including a second antenna and a second reception path, wherein the first transmission path in the first receiver, and the first and second reception paths are utilized when it is determined that an HDR service is occurring, and wherein the second transmission path bypassing the duplexer in the first receiver, and only the second reception path in the second receiver are utilized when the HDR service is not occurring.

2. A system for improving performance in an HDR (High Data Rate) wireless terminal as described in claim 1, wherein the first transmission path comprises:

a multiplier for spreading a transmission signal;
an RF BPF (Radio Frequency Band Pass Filter);
a driver;
a BPF; and
a power amplifier for amplifying the transmission signal, connected in series and transmitting the transmission signal from the first antenna through the duplexer.

3. A system for improving performance in an HDR (High Data Rate) wireless terminal as described in claim 1, wherein the second transmission path comprises:

a multiplier for spreading a transmission signal;
anRF BPF;
a driver;
a BPF; and
a power amplifier, connected in series and transmitting the transmission signal from the first antenna.

4. A system for improving performance in an HDR (High Data Rate) wireless terminal as described in claim 1, wherein the first reception path comprises:

a low noise amplifier for amplifying a received signal;
a BPF;
a multiplier; and
an RF BPF, connected in series, and receiving the received signal from the first antenna through the duplexer.

5. A system for improving performance in an HDR (High Data Rate) wireless terminal as described in claim 1, wherein the second reception path comprises:

a low noise amplifier for amplifying a received signal;
a BPF;
a multiplier; and
an RF BPF, connected in series, and receiving the received signal from the second antenna.

6. A system for improving performance in an HDR (High Data Rate) wireless terminal as described in claim 1, further comprising a microprocessor for controlling the transmission switch.

7. A system for improving performance in an HDR (High Data Rate) wireless terminal as described in claim 1, further comprising a microprocessor for determining whether an HDR transmission is occurring.

8. A system for improving performance in an HDR (High Data Rate) wireless terminal as described in claim 1, wherein the first and second antennas are helical antennas.

9. A system for improving performance in an HDR (High Data Rate) wireless terminal as described in claim 1, wherein the first antenna is a helical antenna combined with a whip antenna.

10. A method for improving performance in an HDR (High Data Rate) wireless terminal using diversity techniques, including a first receiver for signal transmission and reception including a first antenna, a first reception path through a duplexer, a first transmission path through said duplexer, a second transmission path bypassing said duplexer, and a transmission switch for switching between said first and second transmission paths, and a second receiver for receiving high-rate data including a second antenna and a second reception path, the method comprising:

determining whether an HDR transmission is occurring;

positioning the transmission switch to utilize the first transmission path in the first receiver, and receiving signals by commonly utilizing the first and second reception paths when it is determined that an HDR transmission is occurring; and positioning the transmission switch to utilize the second transmission path bypassing the duplexer in the first receiver, and receiving signals by utilizing only the second reception path in the second receiver when it is determined that an HDR transmission is not occurring.

11. A method for improving performance in an HDR (High Data Rate) wireless terminal as described in claim 10, wherein a microprocessor determines whether an HDR transmission is occurring.

12. A method for improving performance in an HDR (High Data Rate) wireless terminal as described in claim 10, wherein a microprocessor controls the positioning of the transmission switch.

13. A method for improving performance in an HDR (High Data Rate) wireless terminal using diversity techniques, including a first receiver for signal transmission and reception including a first antenna, a first reception path through a duplexer, a first transmission path through said duplexer, a second transmission path bypassing said duplexer, and a transmission switch for switching between said first and second transmission paths, and a second receiver for receiving high-rate data including a second antenna and a second reception path, the method comprising:

determining whether an HDR reception is occurring;

positioning the transmission switch to utilize the first transmission path in the first receiver, and receiving signals by commonly utilizing the first and second reception paths when it is determined that an HDR reception is occurring; and positioning the transmission switch to utilize the second transmission path bypassing the duplexer in the first receiver, and receiving signals by utilizing only the second reception path in the second receiver when it is determined that an HDR reception is not occurring.

14. A method for improving performance in an HDR (High Data Rate) wireless terminal as described in claim 13, wherein a microprocessor determines whether an HDR reception is occurring.

15. A method for improving performance in an HDR (High Data Rate) wireless terminal as described in claim 13, wherein a microprocessor controls the positioning of the transmission switch.

* * * * *